United States Patent [19]

Asano et al.

[11] 4,359,992
[45] Nov. 23, 1982

[54] METHOD OF CONTROLLING FUEL SUPPLY TO INTERNAL COMBUSTION ENGINE

[75] Inventors: Masaharu Asano, Yokosuka; Hideyuki Tamura; Shoji Furuhashi, both of Yokohama, all of Japan

[73] Assignee: Nissan Motor Company, Limited, Kanagawa, Japan

[21] Appl. No.: 148,937

[22] Filed: May 12, 1980

[30] Foreign Application Priority Data

May 15, 1979 [JP] Japan .................... 54-58677

[51] Int. Cl.³ .............. F02B 3/00; F02D 21/04; G06F 15/20
[52] U.S. Cl. .................. 123/480; 123/486; 123/487; 123/440; 123/441
[58] Field of Search ............ 123/480, 486, 487, 441, 123/440

[56] References Cited

U.S. PATENT DOCUMENTS

| | | | |
|---|---|---|---|
| 4,200,064 | 4/1980 | Engele | 123/480 |
| 4,205,377 | 5/1980 | Ayama et al. | 123/480 |
| 4,235,204 | 11/1980 | Rice | 123/486 |
| 4,242,728 | 12/1980 | Harfford | 123/480 |
| 4,282,842 | 8/1981 | Sasayama | 123/480 |

*Primary Examiner*—Raymond A. Nelli
*Attorney, Agent, or Firm*—Lowe, King, Price & Becker

[57] ABSTRACT

The calculation of an adjustment value, which is determined by the concentration of oxygen in the exhaust gas, the opening of a throttle valve provided in an intake air passage to the engine, the engine temperature, etc., is started every time a predetermined number of repeatedly produced start signals, the repetition rate of which corresponds to the rotational speed of the crankshaft, occur. A basic value for fuel supply, $T_p = k\, Q/N$, is calculated from the engine operating parameters; the amount of flow of intake air into the engine, Q the rotational speed of the crankshaft, N, and a constant k, and adjusted according to the adjustment value to obtain a control output signal, in the vicinity of the next start signal after said predetermined number.

7 Claims, 8 Drawing Figures

FIG. 3
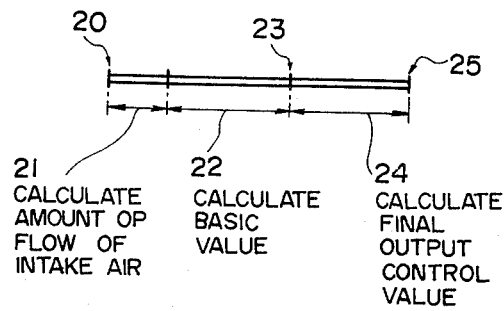
FIG. 4
FIG. 5
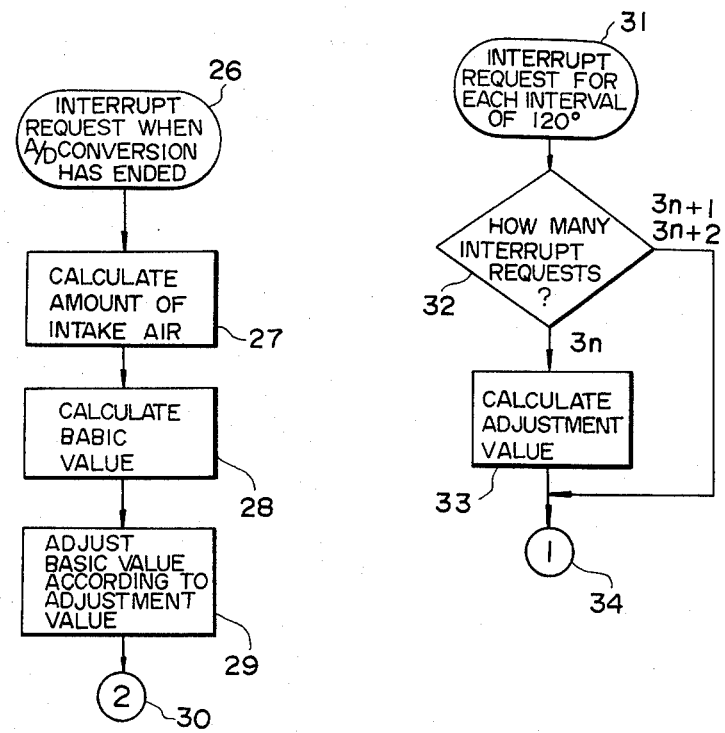

4,359,992

METHOD OF CONTROLLING FUEL SUPPLY TO INTERNAL COMBUSTION ENGINE

BACKGROUND OF THE INVENTION

The present invention relates to a method of controlling fuel supply to an internal combustion engine, and more particularly relates to a method of controlling fuel supply to an internal combustion engine comprising the steps of calculating a basic value for fuel supply to the engine from fundamental operational parameters of the engine, calculating an adjustment value for this basic value, and adjusting the basic value according to the adjustment value to obtain a final control output value.

In FIG. 1 of the accompanying drawings is shown a timing chart for calculation of a final control output value which, in this case, is a value representing the amount of fuel injection for an internal combustion engine. The amount of fuel injection is determined by calculating a basic value for fuel supply, $T_p = k\, Q/N$, from fundamental operational parameters of the engine; the amount of flow of intake air, Q, into the engine, a constant k and the rotational speed of the crankshaft, N, and adjusting the basic value according to an adjustment value which depends on the output of an oxygen sensor, not shown, which senses the concentration of oxygen in the exhaust gas; the opening of a throttle valve, not shown, provided in an intake air passage to the engine; and the temperature of the engine. Thus, fuel is supplied to the engine according to the final control output value once for each rotation of the crankshaft. In FIG. 1, it is assumed that the engine is a 6-cylinder type engine. A crank angle signal 10 is shown as consisting of pulses of $R_1, R_2, R_3, R_4 \ldots$, which are sequentially produced at crankshaft rotational intervals of 120°. The adjustment value is calculated once for each rotation of the crankshaft, at time periods $A_1$ and $A_2$. A calculation start signal 12 is shown as being a clock pulse signal containing clock pulses $T_1 \ldots T_{11}$, but could alternatively be a signal synchronized with the crank angle signal. Calculation of the basic output data, shown by 13, is started, for each of the time period shown as $B_1, B_2, \ldots B_{11}$, when each of the pulses $T_1, T_2 \ldots$ of the calculation start signal 12 is received. A fuel injection valve drive signal 14 is shown as consisting of pulses $C_1, C_2$, one being produced for each rotation of the crankshaft. The latest completed basic output data obtained at time periods $B_1$ and $B_9$ are used for control of fuel supply, after correction by the latest adjustment value. Thus the latest adjustment value obtained at $A_1$ is used for correcting the output value at $B_9$.

As shown in FIG. 1, to simplify the structure of the control device used, the timing of $R_1$ and the start of $A_1$ and $C_1$ are selected to be the same, and the timing of $R_4$ and the start of $A_2$ and $C_2$ are selected to be the same.

The problem with the above described method according to the timing chart shown in FIG. 1 is that the adjustment value obtained at $A_1$ is calculated one full crankshaft rotation before $C_2$, and this value is used for adjusting the basic output value which defines fuel injection time $C_2$, in the time period $B_9$ starting from pulse $T_9$. Thus the adjustment value is rather old, compared with the basic value which it is used to correct. During operation of the engine at substantially constant load and at substantially constant speed, no large effect due to this will occur on the operation of the engine, whereas, however, during a time when the operating conditions are fluctuating, it is difficult to maintain the air/fuel ratio at a proper constant value when the amount of fuel supplied to the engine is controlled on a feedback basis, for example, using information on the components of the exhaust gas.

SUMMARY OF THE INVENTION

Therefore, it is an object of the invention to provide a method of controlling fuel supply to an internal combustion engine, which avoids the above explained problems.

According to the present invention, there is provided a method of controlling fuel supply to an internal combustion engine having a crankshaft, comprising the steps of; starting to calculate an adjustment value every time a predetermined number of repeatedly produced start signals, the repetition rate of which corresponds to the rotational speed of the crankshaft, occur; calculating a basic value for fuel supply from engine operating parameters, and adjusting the basic value according to the adjustment value to obtain a control output signal in the vicinity of the next start signal after said predetermined number of start signals.

Thus, according to the present invention, the basic value is adjusted according to a more recent adjustment value, thereby improving control. When the operating conditions, such as the load, change rapidly, proper control is possible of the flow of fuel in a feedback mode, using the sensed ratio of exhaust gas components, for example. This brings about a stable mixture ratio of air and fuel.

BRIEF DESCRIPTION OF THE DRAWINGS

Other features and advantages will be apparent from the following description, taken in conjunction with the accompanying drawings which are given by way of illustration only and which is not intended to be limitative. In the drawings:

FIG. 3 shows in detail the step of preparing a final output control value in the method of FIG. 2;

FIG. 4 is a flowchart of a program which executes the method of FIG. 2;

FIG. 5 is a flowchart of a program which calculates adjustment value in the method of FIG. 2;

DETAILED DESCRIPTION OF THE PREFERRED EMBODIMENTS

Figure 1:
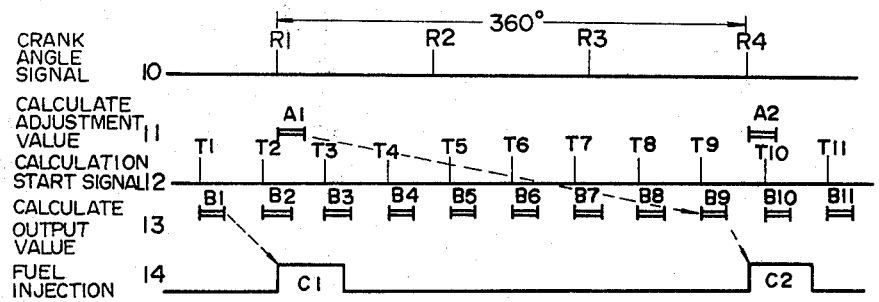
FIG. 1 is a timing chart of a method of controlling fuel supply to an internal combustion engine.
Figure 2:
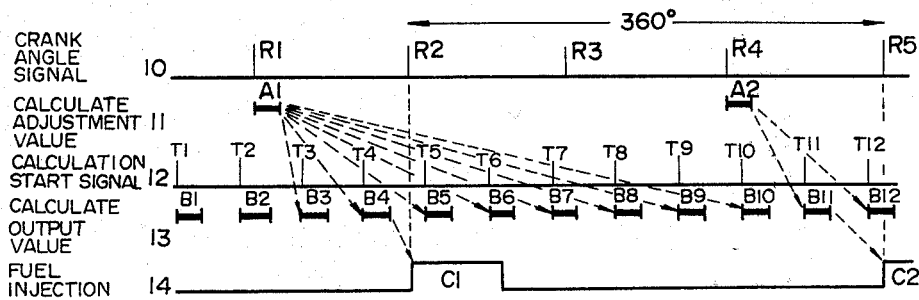
FIG. 2 is a similar timing chart of a method according to a first embodiment of the present invention.

In FIG. 2 is shown a timing chart for carrying out, by a computer program, a first preferred embodiment of the method according to the present invention. In order to contrast the method according to the present invention and the method illustrated in FIG. 1, the same reference numeral denotes corresponding signals or signal components, and calculation of an amount of flow of fuel supplied to a 6-cylinder internal combustion engine is shown as an example only. Since the engine is a 6-cylinder engine, the crank angle signal 10 consists of a train of pulses $R_1$ to $R_5$, etc., produced sequentially at crankshaft rotational intervals of 120°. The calculation start signal 12 is a clock pulse signal consisting of pulses $T_1$ to $T_{12}$ which are produced independently of the crank angle signal.

In order to produce the fuel injection valve drive signal 14, shown as consisting of pulses $C_1$, $C_2$, etc., for every three pulses of the crank angle signal 10, a ternary counter, not shown, is used to process the pulses of the crank angle signal 10. The contents of the count in the counter can be classified as being $3n$, $3n+1$, or $3n+2$, where $n = 0, 1, 2, \ldots N$. According to the program, the adjustment value is calculated at every count value $3n$. Calculation of the final output value is effected before every $(3n+1)$, and the injection valve is driven at every count value $(3n+1)$. A state signal consisting of two bits can be used, changing as "00", "01", "11", "00"..., to calculate the adjustment value at "00" and to produce the injection value drive signal 14 at the state of "01".

As shown in FIG. 2, the calculation of the adjustment value is started at $R_1$ and carried out for a time period of $A_1$. The adjustment value thus obtained is used for adjustment of basic output value calculated in each time period $B_3$ to $B_{10}$. Thus, since the final control output value used for the fuel injection for the time period represented by $C_1$ is the latest value calculated at $B_4$, the latest adjustment value obtained at $A_1$ is used. In the same way, the final control output value used for the fuel injection for the time period shown by $C_2$ is adjusted at $B_{11}$ according to the adjustment value obtained at $A_2$.

Referring to FIG. 3, the details of calculation of the output value in each time period B are shown. The program makes the time point 20 of completing A/D conversion of the amount of flow of intake air coincident with the pulse of the calculation start signal 12 (clock pulse signal). When the calculation of the amount of flow of intake air, shown by 21, is completed, a basic value for fuel injection is calculated at 22, using data such as the rotational speed of the crankshaft, the amount of flow of intake air, etc., (the rotational speed of the crankshaft is beforehand calculated separately). Simultaneously with the completion of the calculation of the basic value, shown at 22, the adjustment value is taken in at time point 23, and, when the calculation of the final control output value at 24, (correcting the basic value using the adjustment value) is completed, the final output control value is sent to an output interface, not shown, at time point 25 for output. As shown in FIG. 3, since the basic value for fuel injection is calculated at 22 immediately after the amount of flow of intake air is determined, this basic value calculation is effected using the latest available information.

When both calculations, shown by A and B, overlap, it is arranged such that one of them is of first priority, or alternatively the one which has been earlier carried out is of first priority. In FIG. 2, $A_1$, $B_2$, etc., are shown as overlapping, for the purpose of clarifying the description.

The output interface to which the final output control value, the, calculation of which is shown in FIG. 3, is fed is updated by the latest value thereof, and supplies an output when each of the pulses $R_2$ and $R_5$ is input thereto.

In FIG. 4 the steps of calculation shown in FIG. 3 are shown as a flowchart. When the A/D conversion of the amount of flow of intake air is completed, an interrupt request is effected at 26, so that the series of calculations of the amount of intake air, shown by 27, the basic value, shown by 28, and correction of the basic value using the adjustment value, shown by 29, are carried out.

In FIG. 5 is shown a flowchart for starting a program to calculate the adjustment value. In the particular example shown in FIG. 2, the crank angle signal 10 includes pulses $R_1$ to $R_5$ sequentially produced at intervals of 120°. Interrupt requests $R_1$ to $R_5$ occurring sequentially at intervals of 120°, shown at 31, start a ternary counter, not shown, at a step 32 of the program. If the counted number of pulses of the crank angle signal is $3n$, where $n = 0, 1, 2 \ldots n$, calculation of the adjustment value starts at 33. If the counted number of pulses at the crank angle signal is $3n+1$, the contents of the ternary counter is 1, so that the fuel injection valve drive signal 14 occurs, as $C_1$ and $C_2$ defining fuel injection time periods, respectively. The adjustment value, obtained at 33 in FIG. 5, is used in the output calculation at 29 in FIG. 4.

Figure 6:
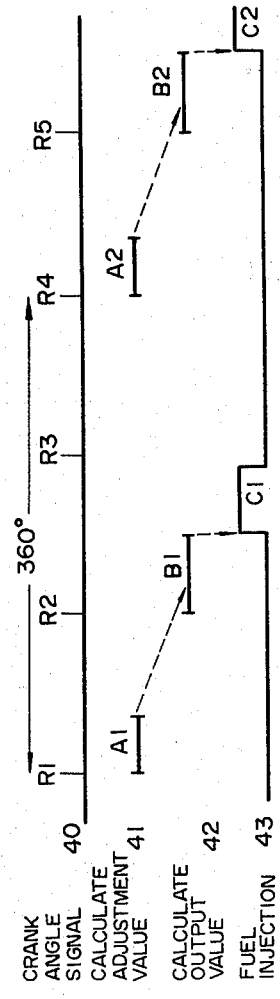
FIG. 6 is a timing chart of a second embodiment of the method of the present invention.

In FIG. 6 there is shown a timing chart of a second embodiment of the method of the present invention, also carried out by a computer, in which the calculation start signal 12 is given by pulses $R_1$ to $R_5$ of the crank angle signal 40, occurring at intervals of 120°, without using any clock pulse signal such as shown in FIGS. 1 and 2. The calculation of the adjustment value, shown by 41, is shown as being carried out at the time periods $A_1$ and $A_2$. The calculation of the output value is shown as being carried out at the time periods $B_1$ and $B_2$. The fuel injection valve drive signal 43 is shown as containing pulses $C_1$ and $C_2$ defining fuel injection time periods, respectively. As shown in the figure, the adjustment value is calculated for the time periods $A_1$ and $A_2$ which start with the signal pulses $R_1$ and $R_4$ produced sequentially at crank rotational intervals of 360°. The output value is calculated for the time periods of $B_1$ and $B_2$ starting with $R_2$ and $R_5$, respectively. Immediately after this calculation, the fuel injection valve is driven at $C_1$ and $C_2$.

Figure 7:
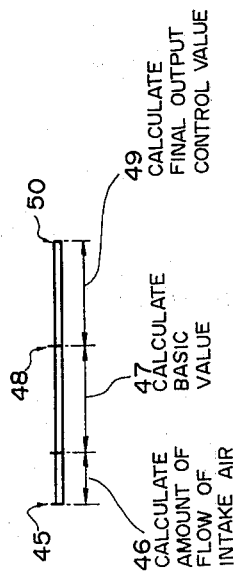
FIG. 7 shows in detail the step of preparing a final output control value in the method of FIG. 6.

In FIG. 7 are shown the details of calculating the output data during time periods $B_1$, $B_2$ shown in FIG. 6. The A/D conversion of the amount of flow of intake air is started at 45, which is simultaneous with the pulses $R_2$ and $R_5$ of the crank angle signal. Immediately after this conversion at 45, an amount of flow of intake air is calculated at 46, and a basic value for fuel injection is calculated at 47 from data such as the rotational speed of the crankshaft, the amount of flow of intake air, etc. The adjustment value calculated at $A_1$, or $A_2$ is taken in at time point 48, and then the basic value is adjusted at 49 according to the adjustment value to obtain a final output value. Immediately after this adjustment, each of the pulses $C_1$, $C_2$ of the fuel injection drive signal 43 starts fuel injection at 50. In this particular embodiment, the number of repetitions of calculating the basic value is relatively small, and it is therefore possible for the computer to perform other control functions between the pulses $R_3$ and $R_4$.

Figure 8:
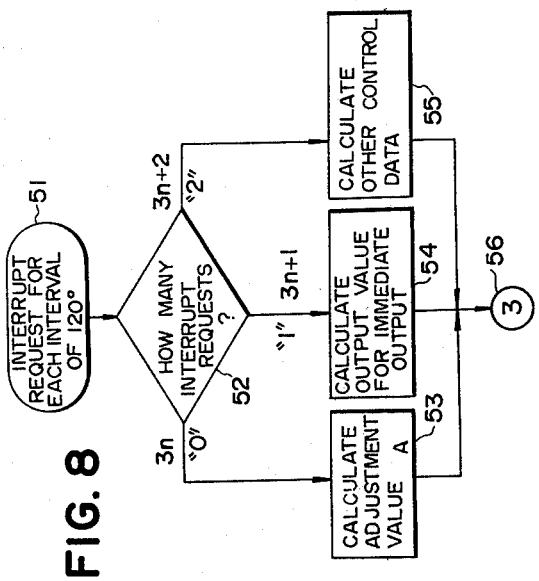
FIG. 8 is a flowchart of a program which executes the method of FIG. 6.

FIG. 8 shows a flowchart of a program which corresponds to the timing chart of FIG. 6. Each time the pulses $R_1$ to $R_4$ of the crank angle signal are produced sequentially at an interval of 120°, an interrupt request to the computer is effected at 51. This interrupt request signal is sent to a ternary counter, not shown, which classifies the number of interrupt requests produced, at 52, with respect to 3. When the number is $3n$, the adjustment value is calculated, at A, i.e. at a step 53. When the number is 3n+1, the calculation of the output value at B is effected at 54. When the number is 3n+2, calculations other than the calculation for fuel injection can be performed at 55. The final output control value is fed at 56 to a memory, not shown. The final control value fed from block 54 to the memory is immediately used for fuel injections at $C_1$ or $C_2$.

While the present invention has been particularly shown and described with reference to preferred embodiments thereof, it will be understood by those skilled in the art that the foregoing and other changes in form and details may be made therein without departing from the spirit and scope of the present invention.

What is claimed is:

1. A method of controlling fuel supply to a multicylinder internal combustion engine having a fuel injection valve and a plurality of sensors for measuring engine operating conditions, comprising the steps of:
   (a) measuring engine crankshaft rotation;
   (b) producing a crank angle pulse signal on the basis of said crank rotation measurement, the pulses of which signal occur each time the crankshaft rotates through a predetermined angle;
   (c) measuring a plurality of other engine operating conditions;
   (d) producing information signals indicative of the plurality of the other engine operating conditions;
   (e) beginning a calculation of a fuel injection duration adjustment and calculating the adjustment as a function of at least one information signal indicative of engine operating conditions in response to a first pulse of said crank angle signal;
   (f) starting a calculation of a basic fuel injection duration and calculating the duration as a function of information signals indicative of engine operating conditions, including crankshaft rotation, after the fuel injection duration adjustment calculation, ending the basic fuel injection duration calculation before the crank angle signal pulse immediately following said first pulse;
   (g) starting a calculation of an output value and calculating the value as a function of said basic fuel injection duration and said fuel injection duration adjustment after said basic fuel injection duration calculation, ending the output value calculation before the crank angle signal pulse immediately following said first pulse;
   (h) opening the fuel injection valve in response to the crank angle signal pulse immediately following said first pulse; and
   (i) closing the fuel injection valve after a time interval corresponding to said output value.

2. A method of controlling fuel supply to an internal combustion engine having a fuel injection valve and a plurality of sensors for measuring engine operating conditions, comprising the steps of:
   (a) measuring engine crankshaft rotation;
   (b) producing a crank angle pulse signal on the basis of said crank rotation measurement, the pulses of which signal occur for each crank rotation of 720°/P, where P is the number of engine cylinders;
   (c) measuring a plurality of other engine operating conditions;
   (d) producing information signals indicative of the plurality of other engine operating conditions;
   (e) beginning a calculation of a fuel injection duration adjustment and calculating the adjustment as a function of at least one information signal indicative of engine operating conditions in response to a first pulse of said crank angle signal;
   (f) starting a calculation of a basic fuel injection duration and calculating the duration as a function of information signals indicative of engine operating conditions, including crankshaft rotation, in response to the crank angle signal pulse immediately following said first pulse;
   (g) starting a calculation of an output value and calculating the value as a function of said basic fuel injection duration and said fuel injection duration adjustment immediately after said basic fuel injection duration calculation;
   (h) opening the fuel injection valve immediately after said output value calculation; and
   (i) providing a control signal representative of said output value, and displacing said control signal in time from the time of opening the fuel injection valve by a time interval corresponding to said output value; and
   (j) closing the fuel injection valve responsively to said displaced control signal.

3. The method of claim 1, further comprising the step of producing a clock pulse signal independent of and of higher frequency than said crank angle pulse signal, and wherein said step of calculating basic fuel injection duration begins in response to each pulse of the clock pulse signal.

4. The method of claim 3, wherein the step of calculating an output value begins immediately after each step of calculating the basic fuel injection duration, and further comrising the step of storing the output value in an output interface provided for the engine until updated by the next output value for use in the step of closing the fuel injection valve.

5. The method of any one of claims 1-4, further comprising the step of measuring intake air flow into the engine,
   wherein the basic fuel injection duration is calculated on the basis of engine rotation speed as measured via the engine crankshaft, and intake air flow.

6. The method of any one of claims 1-4, wherein said step of measuring a plurality of other engine operating conditions further comprises the steps of:
   measuring engine coolant temperature, and measuring exhaust gas oxygen concentration,
   wherein said step of calculating a fuel injection duration adjustment is based on said measured engine temperature, exhaust gas oxygen concentration, and engine load.

7. The method of claim 6 wherein said step of measuring a plurality of other engine operating conditions further comprises the step of measuring throttle valve angle.

* * * * *